United States Patent [19]

Schuster

[11] 4,033,112

[45] July 5, 1977

[54] FUEL CONTROL FOR GAS TURBINE ENGINE

[75] Inventor: Robert W. Schuster, South Bend, Ind.

[73] Assignee: The Bendix Corporation, South Bend, Ind.

[22] Filed: Sept. 25, 1975

[21] Appl. No.: 616,731

[52] U.S. Cl. .................................... 60/39.28 R
[51] Int. Cl.² .................................... F02C 9/08
[58] Field of Search ....... 60/39.28 R, 243, 39.16 R; 415/10, 17, 30

[56] References Cited

UNITED STATES PATENTS

| | | | |
|---|---|---|---|
| 3,487,482 | 1/1970 | Maljanian | 60/39.16 R |
| 3,496,721 | 2/1970 | Lloyd | 60/39.28 |
| 3,672,163 | 6/1972 | White | 60/39.28 R |
| 3,712,055 | 1/1973 | McCabe | 60/39.28 R |

*Primary Examiner*—Clarence R. Gordon
*Attorney, Agent, or Firm*—William N. Antonis; Ken C. Decker

[57] ABSTRACT

Fuel control apparatus including a fuel conduit connected to receive pressurized fuel from a fuel pump and provided with fuel servo actuated metering valve means therein for controlling the rate of fuel flow therethrough to an engine. The fuel servo actuated metering valve is actuated by a fuel servo piston pressurized by a servo valve controlled fuel pressure differential derived from a predetermined fuel pressure differential maintained by a pressurizing valve downstream from and in series flow relationship with the metering valve. The metered fuel flow for actuating the servo piston is extracted from the fuel conduit upstream from the pressurizing valve and returned to the fuel conduit downstream from the pressurizing valve.

12 Claims, 1 Drawing Figure

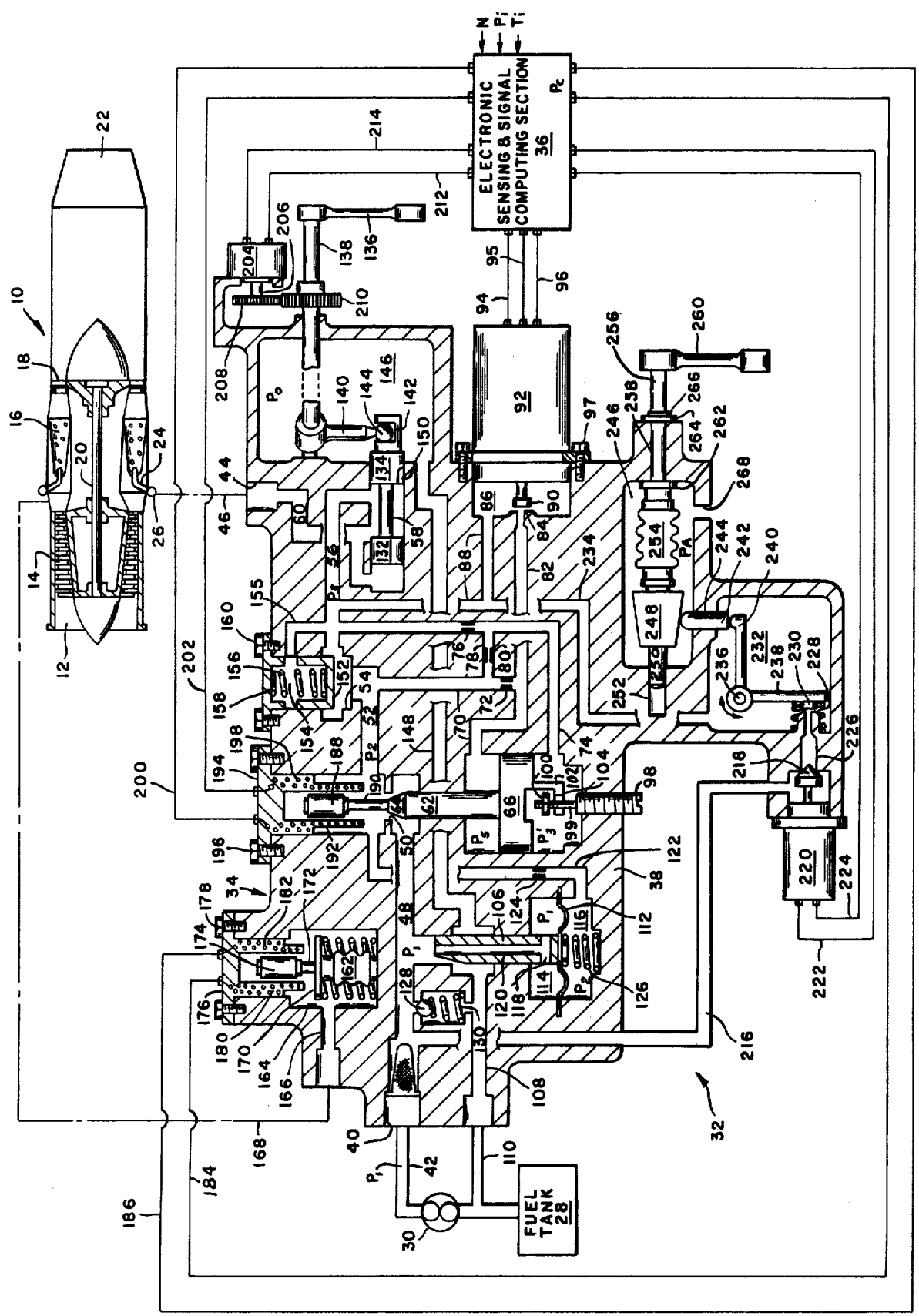

4,033,112

FUEL CONTROL FOR GAS TURBINE ENGINE

BACKGROUND OF THE INVENTION

Conventional fuel control systems utilizing fuel operated servo devices for actuating a positionable member such as a fuel metering valve or other engine control devices are well known in the art. It has been a common practice to extract from fuel pump output flow the required pressurized fuel flow for input to the servo and vent servo exhaust flow to a relatively low pressure fuel source such as the inlet of the fuel pump. Obviously such an arrangement wherein relatively high pressure fuel discharged by the fuel pump and used for servo control purposes undergoes a substantially large pressure drop in passage to the fuel pump inlet and resultant energy loss. Furthermore, the fuel pump capacity which generally dictates size and weight of the fuel pump must be selected to fulfill the fuel flow requirements of the engine. In addition, the increased fuel pump capacity necessitated by the servo means places a corresponding higher demand on power input to drive the fuel pump.

Reference is made to U.S. Pat. No. 3,521,447 to F. R. Rogers and D. L. Greenawalt for example of a known fuel control having a fuel operated servo network wherein the total output flow of a fuel pump is available for energizing fuel operated servo means as well as for fuel metering purposes to operate an engine. The subject matter of U.S. Pat. No. 3,521,447 represents a significant advance in the fuel control art in that it avoids the above-mentioned undesirable features normally found in fuel controls embodying fuel operated servo networks. The present invention represents an improvement over the apparatus shown and described in U.S. Pat. No. 3,521,447 in that the same desired results are obtained in a much simpler manner with less complicated structure.

SUMMARY OF THE INVENTION

The present invention relates to a gas turbine engine fuel control having a fuel operated servo actuated fuel metering valve which servo includes a piston responsive to pressurized fuel diverted from a main metered flow of fuel established by the metering valve and subsequently returned to the main metered flow of fuel.

It is an object of the present invention to provide a fuel control having metering valve means for establishing a metered glow of fuel and fuel operated servo apparatus for actuating the metering valve in response to a fuel pressure differential derived from the flow of metered fuel.

It is another object of the present invention to provide a fuel control having metering valve means for establishing a metered flow of fuel and fuel operated servo apparatus for actuating the metering valve in response to a fuel pressure differential derived from a fuel pressurizing valve in series flow with and downstream of the metering valve.

Other objects and advantages of the present invention will be apparent to those skilled in the art from the following description taken with the accompanying drawing.

BRIEF DESCRIPTION OF THE DRAWING

The drawing is a schematic representation of a gas turbine engine and associated fuel control apparatus embodying the present invention.

DESCRIPTION OF THE PREFERRED EMBODIMENT

Referring to the drawing, numeral 10 designates a conventional gas turbine engine having an air inlet 12, an air compressor 14, a plurality of combustion chambers 16, a gas turbine 18 connected via a shaft 20 to the compressor 14 to drive the same, and an exhaust nozzle 22 from which the products of combustion are expelled to the atmosphere. A plurality of fuel injection nozzles 24 connected to a fuel manifold 26 are adapted to inject metered pressurized fuel into the combustion chambers 16 where the resulting air fuel mixture is burned to generate hot motive gas which passes through turbine 18 to drive compressor 14 and exhausts through nozzle 22 to the atmosphere to generate a propelling thrust.

A metered flow of fuel is supplied to fuel manifold 26 via a fuel tank 28, an engine driven fuel pump 30 of the positive displacement type, a fuel control generally indicated by 32 and including a hydromechanical fuel flow control section 34 and electronic sensing and signal computing section 36.

The electronic sensing and signal computing section 36 is conventional structurally and operationally in that it is connected to receive electrical input signals representing selected variable conditions of engine operation as, for example, engine speed N, compressor discharge air pressure $P_c$, power lever position PLA and compressor inlet air temperature $T_t$ or other engine temperatures. The electrical input signals are sensed, compared electronically in a conventional manner resulting in a computed electrical signal which may be suitably amplified and discharged as an electrical output signal to the fuel section 34 for control purposes as will be described.

The hydromechanical fuel flow control section 34 includes a casing 38 having a fuel inlet 40 connected to receive pressurized fuel $P_1$ from fuel pump 30 via a conduit 42 and a fuel outlet 44 connected to supply metered fuel flow to fuel manifold 26 via conduit 46. The inlet 40 and outlet 44 are connected by a main fuel conduit which includes a passage 48, a fuel metering valve restriction 50, a passage 52, a fuel pressurizing valve restriction 54, a passage 56, a fuel cutoff valve 58 and a passage 60. A fuel metering valve 62 slidably carried by casing 38 is provided with a tapered end 64 which cooperates with restriction 50 to vary the effective flow area thereof. The opposite end of metering valve 62 is fixedly secured to a servo piston 66 slidably carried in a chamber 68 which is vented to passage 52 intermediate restrictions 50 and 54 via a passage 70 containing a restriction 72. A passage 74 containing a restriction 76 communicates chamber 68 with passage 56 intermediate restriction 54 and cutoff valve 58. The passages 70 and 74 are connected via a passage 78 containing a restriction 80. The restrictions 72, 76 and 80 are preferably of the same effective flow area. The passage 70 downstream from restriction 72 is vented to passage 56 intermediate restriction 54 and cutoff valve 58 via a passage 82, a servo valve restriction 84, a chamber 86 and a passage 88. The effective flow area of restriction 84 and thus servo fuel pressure $P_s$ in chamber 68 is controlled by a movable servo valve 90 actuated by a conventional proportional electrical solenoid generally indicated by 92 which is electrically energized by electronic computing section 36 via suitable electrical leads 94, 95 and 96. The solenoid 92 is removably secured to casing 38 by suitable fastening means such as bolts 97.

The piston 66 is responsive to fuel pressure differential $P_x - P_3$ established thereacross in chamber 68 via passages 70 and 74. Maximum and minimum open positions of metering valve 62 are established by adjustable stop means including a screw member 98 threadedly engaged with casing 38 and provided with a threaded stem 99 to which a nut 100 is threadedly secured. An arm 102 extending from piston 66 is slotted as at 104 to slidably receive stem 99 thereby allowing arm 102 to engage nut 100 or screw member 98 and limit the travel of piston 66 and metering valve 62 accordingly. It will be noted that screw member 98 may be adjusted to establish the maximum open position and thus maximum flow position of metering valve 62 whereas nut 100 may be adjusted to establish the minimum open position and thus minimum flow position of metering valve 62.

A predetermined constant fuel pressure differential is maintained across metering valve restriction 50 regardless of the position of metering valve 62 by a bypass valve 106 disposed in a fuel bypass conduit 108 connecting passage 48 with a fuel return passage 110 leading to the inlet of pump 30 at relatively low pump inlet pressure $P_o$. The bypass valve 106 is slidably carried by casing 38 and actuated by a diaphragm 112 fixedly secured to one end of valve 106. The diaphragm 112 is fixedly secured at its outermost peripheral portion to casing 38 and partially defines two chambers 114 and 116. Chamber 114 is vented to passage 48 at fuel pressure $P_1$ via radial and axial passages 118 and 120, respectively, in valve 106. Chamber 116 is vented to passage 52 at metered fuel pressure $P_2$ via a passage 122 containing a restriction 124. A compression spring 126 interposed between casing 38 and by pass valve 106 serves to preload the valve 106 in a closing direction against the opposing force derived from diaphragm 112 to thereby regulate bypass flow through conduit 108 and thus pressure $P_1$ as necessary to maintain the $P_1-P_2$ differential at the selected value.

A fuel pressure relief valve 128 loaded by a compression spring 130 vents passage 48 to passage 108 in the event fuel pressure $P_1$ reaches a predetermined maximum allowable value.

The fuel cutoff valve 58 operates to shut off fuel flow to the fuel manifold and simultaneously vent passage 56 at metered fuel pressure $P_2$ to relatively low fuel pump inlet pressure $P_o$. To that end, the cutoff valve 58 is slidably carried by casing 38 and provided with spaced apart lands 132 and 134 which move into or out of engagement with passages 56 and 60, respectively, in response to movement of a power control lever 136. The power control lever 136 is fixedly secured to a shaft 138 suitably mounted for rotation in casing 38 and provided with a lever arm 140. The cutoff valve 58 has a slotted end portion 142 adapted to slidably receive the free end 44 of lever arm 140. The end portion 142 is exposed to a chamber 146 vented via a passage 148 to bypass conduit 108 at pump inlet pressure $P_o$. A notch or port 150 formed in land 134 is adapted to clear casing 38 thereby venting passage 60 to chamber 146 at pressure $P_o$ when valve 58 is actuated to a fuel cutoff position.

The effective flow area of fuel pressurizing valve restriction 54 and thus pressure differential $P_2-P_3$ thereacross is controlled by a cup-shaped pressurizing valve 152 slidably carried in casing 38 and, in part, defining a chamber 154 which chamber 154 is vented via a passage 155 to passage 56 at fuel pressure $P_3$. A compression spring 156 interposed between valve 152 and a spring retaining cap or plug 158 removably secured to casing 38 by any suitable fastening means such as bolts 160 serves to preload valve 152 in a closing direction in opposition to the force derived from fuel pressure differential $P_2-P_3$ acting across the base of valve 152. The use of a spring loaded pressurizing valve to establish a predetermined fuel back presssure in a fuel control for control purposes is a common feature in known fuel controls. However, it will be noted that Applicant's pressurizing valve 152 serves a dual purpose in that it not only establishes a fuel back pressure by remaining closed until spring 156 is overcome by a predetermined fuel pressure $P_2$ but also, upon valve 152 opening, the chamber 154 is pressurized by the fuel pressure $P_3$ in passage 56. The throttling effect of valve 152 on metered fuel flow through restriction 54 serves to maintain the pressure differential $P_2-P_3$ at a constant value depending upon the load exerted by spring 156.

An electrical signal representing compressor discharge pressure $P_c$ is produced by an evacuated bellows 162 exposed to a chamber 164 which is vented to the discharge end of compressor 14 via passages 166 and 168. The bellows 162 is anchored at one end to casing 38 and at its opposite movable end, is fixedly secured to a spring retaining plate 170. A stem or rod 172 fixedly secured to plate 170 is provided with a circular slug 174 of magnetic material fixedly secured thereto. A cup-shaped cap 176 removably secured to casing by suitable fastening means such as screws 178 is provided with an annular section 180 which is adapted to receive slug 174 in radical spaced relationship therewith and which is provided with wire coils 182 embedded therein. Electrical leads 184 and 186 connect coil 182 to electronic section 36 to thereby transmit an electrical signal indicative of the position of bellows 162 in response to compressor discharge pressure $P_c$.

A metering valve 62 position feedback electrical signal is generated by a circular slug 188 fixedly secured to a stem 190 which stem 190 is fixedly secured to valve 62 and axially movable therewith. The slug 188 is received by an annular section 192 of a cup-shaped cap 194 fixedly secured to casing 38 by suitable fastening means such as screws 196 and, like cap 176, provided with wire coils 198 embedded therein. Electrical leads 200 and 202 connect coils 200 to electronic section 36 to thereby transmit an electrical signal indicative of the position of metering valve 62.

An electrical signal representing power lever 136 position is generated by a conventional potentiometer 204 having a rotatable shaft 206 on which a gear 208 is mounted to actuate the same. A gear 210 fixedly secured to shaft 138 is meshed with gear 208 to drive gear 208 in response to movement of power lever 136. Electrical leads 212 and 214 connect potentiometer 204 to electronic section 36 to thereby transmit the electrical signal therebetween.

Emergency control of fuel flow in the event of electrical power failure is provided by normally closed conduit means in parallel flow relationship with metering valve 62 and pressurizing valve 152, which conduit means includes a passage 216 connected to passage 48 at unmetered fuel pressure $P_1$, a movable valve member 218 actuated to a normally closed position by an electrically energized solenoid 220 provided with electrical leads 222 and 224 to electronic section 36, a passage 226 terminating in a variable area restriction 228 controlled by a positionable valve 230, a chamber 232 and a passage 234 leading from chamber 232 to passage 56 downstream from pressurizing valve 152. A bellcrank pivotally secured to a fixed support 236 is provided with an arm 238 having a positionable valve 230 fixedly secured thereto and a second arm 240 engageable with a cam follower pin 242. The cam follower pin 242 is slidably carried in an opening 244 in casing 38 which separates chamber 232 from a chamber 246. The follower pin 242 bears against a rotatably and axially movable three dimensional cam 248 secured to a shaft 250 extending from one end thereof into a recess 252 in casing 38 which slidably supports shaft 250 for rotatable and axial movement. The opposite end of cam 248 is fixedly secured to a free end of an evacuated bellows 254 coaxial with cam 248 and exposed to chamber 246. The opposite end of bellows 254 is anchored to one end of a rotatable shaft 256 which extends through an opening 258 in casing 38 into engagement with manually actuated power lever 260 fixedly secured thereto. The shaft 256 is prevented from shifting axially by spaced apart flanged portion 262 and washer 264 which slidably engage casing 38. A snap ring 266 engageable with shaft 256 retains washer 264 in position on shaft 256. The chamber 246 is vented to ambient or atmospheric air pressure $P_A$ via a port 268. It will be understood that the cam 248 is rotatably positioned by power lever 260 and axially positioned by bellows 254 which expands or contracts, depending upon the relative change in pressure $P_A$ imposed thereon.

The engine 10 is put in operation by actuating the power lever 136 to an engine start position which through conventional control apparatus, not shown, acts to crank the engine 10 to a self-sustaining engine speed as will be recognized by those persons skilled in the gas turbine engine field. During engine cranking the fuel pump 30 is driven by the engine resulting in a flow of pressurized fuel to inlet 40 and thus pressurization of the interior of casing 38. The fuel pressurizing valve 152 is held in a closed position by spring 156 until a predetermined fuel pressure $P_2$ in passage 52 is reached whereupon valve 152 opens to admit fuel to passage 56. Assuming the powder lever 136 is advanced to an engine idle position, the cut-off valve 58 will occupy an open position permitting fuel to pass through outlet 44 and conduit 46 to fuel manifold 26 thereby pressurizing injectors 24. The fuel pressure $P_3$ in passage 56 is transmitted through passage 155 to chamber 154 where it acts against valve 152 in opposition to fuel pressure $P_2$ causing closing movement of valve 152 to increase the pressure differential $P_2-P_3$ thereacross which, upon reaching a predetermined value and in combination with the effective area of valve 152 exposed thereto, produces a force balancing the opposing force of spring 156. The valve 152 will respond to a change in pressure $P_2$ or $P_3$ tending to upset the balanced condition of valve 152 and actuate valve 152 in a closed or open position as necessary to maintain the predetermined differential $P_2-P_3$ thereacross.

The potentiometer 204 is positioned by power lever 136 thereby generating a corresponding output signal to electronic section 36 which section 36 also receives an input electrical signal representing existing engine speed N as pointed out heretofore. The power request and engine speed signals are compared resulting in a speed error signal which is transmitted to solenoid 92 which, in turn, is energized causing valve 90 to move in a closing direction in proportion to the error signal. The resulting increase in pressure $P_x$ unbalances piston 66 in a direction to open metering valve 62 thereby increasing fuel flow through metering restriction 50 causing an increase in pressure $P_2$ in passage 52 and thus a decrease in pressure differential $P_1-P_2$ across metering restriction 50 as well as an increase in pressure differential $P_2-P_3$ across pressurizing valve 152. The slug 188 moves axially through annular section 178 in response to movement of valve 62 thereby generating an electrical position feedback signal to electronic section 36 which feedback signal is compared to the output signal applied to solenoid 92 to ensure the desired position of valve 62. The bypass valve 106 is actuated toward a closed position by diaphragm 112 in response to the increase in pressure $P_2$ thereby reducing the bypass flow to increase pressure $P_1$ as necessary to reestablish the predetermined differential $P_1-P_2$. The pressurizing valve 152 is actuated in an opening direction in response to the pressure $P_2$ increase thereby reducing the flow throttling effect of valve 152 which results in an increase in pressure $P_3$ in passage 56 to the extent that the predetermined differential $P_2-P_3$ is reestablished across pressurizing valve 152. It will be understood that the abovementioned pressure variations are relatively brief, such that the pressure differentials $P_1-P_2$ and $P_2-P_3$ may be considered substantially constant regardless of the area change of metering restriction 50. The increase in fuel flow passes through cutoff valve 58 and outlet 44 to the engine 10 causing an increase in speed N which, in turn, is transmitted to electronic section 36. As speed N increases toward the desired idle condition the speed error output signal applied to solenoid 92 diminishes and ultimately becomes zero upon engine speed stablizing at the selected idle speed. Movement of power lever 136 to higher power positions requesting an engine acceleration results in a similar sequence of operation whereas movement of power lever 136 from a higher to a lower power position requesting engine deceleration results in a reverse sequence of operation as will be understood by those persons skilled in the art.

Preferably the restrictions 72, 76 and 80 are selected with equal effective flow areas such that the $P_2-P_3{}^1$ pressure drop across restriction 80 is equal to the drop $P_3{}^1-P_3$ across restriction 76 or one-half the total pressure drop $P_2-P_3$ across both restrictions 80 and 76. The pressure $P_3{}^1$ intermediate restrictions 80 and 76 and acting against piston 66 is therefore maintained midway between pressures $P_2$ and $P_3$ such that a relatively large pressure differential $P_x-P_3{}^1$ is available at all times to power the piston 66 in the event of sticking of the latter.

In the event of an electrical power failure, the solenoid 92 is deenergized and suitably designed to move valve 90 to a fully open position thereby reducing pressure $P_x$ which unbalances piston 66 and thus metering valve 62 to a minimum flow position. Simultaneously, the power failure causes deenergization of solenoid 220 which moves valve 218 to a fully open position whereupon fuel flow through passage 226 is controlled by the effective area of valve 230. The position of valve 230 is dependent upon the position of cam 248 which is rotated by power lever 260 and actuated axially in response to atmospheric or compressor inlet air pressure $P_A$ thereby establishing an emergency fuel flow through passage 234 which is a function of power lever 260 position modified by atmospheric pressure $P_A$.

It will be noted that the pressurizing valve 152 provides a relatively large fuel pressure differential $P_2-P_3$ for powering the metering valve piston 66 and eliminates the need for conventional separate fuel pressurizing valve apparatus in the main supply conduit to the engine and fuel pressure regulating valve apparatus for servo use. In addition, the metering valve 62 stroke may be made relatively large to reduce gain sensitivity of the metering valve 62 thereby improving accuracy.

I claim:

1. Fuel control apparatus for a combustion engine comprising:
 - a fuel supply conduit for conducting a flow of pressurized fuel from a pressurized source to said engine;
 - first positionable valve means operatively connected to said supply conduit for establishing a controlled flow of fuel therethrough to said engine;
 - first fuel pressure differential responsive means operatively connected to said first valve means for actuating the same;
 - second valve means operatively connected to said supply conduit in series flow relationship with said first valve means and downstream therefrom for creating a predetermined back pressure against fuel flow through said first valve means and restricting fuel flow to establish a predetermined fuel pressure differential in said supply conduit;
 - resilient means operatively connected to said second valve means for urging the same to a closed position in opposition to the fuel pressure upstream therefrom;
 - second fuel pressure differential responsive means vented to said supply conduit upstream and downstream from said second valve means and responsive to the fuel pressure differential therebetween for actuating said second valve means in an opening direction in opposition to said resilient means;
 - first passage means connected to said supply conduit in parallel flow relationship with said second valve means;
 - second passage means connecting said first fuel pressure differential responsive means to said supply conduit downstream from said second valve means;
 - a restriction in said first passage means;
 - a variable area valve in said first passage means for controlling the fuel pressure intermediate said restriction and said variable area valve; and
 - control means responsive to a plurality of variable conditions of engine operation operatively connected to said variable area valve for actuating the same;
 - said first fuel pressure differential responsive means being verted to said first passage means intermediate said restriction and said variable area valve and responsive to the fuel pressure differential between said intermediate fuel pressure and said fuel pressure in said second passage means.

2. Fuel control apparatus as claimed in claim 1 and further including:
 - a restriction in said second passage means; and
 - third passage means having a restriction therein connecting said first passage means upsteam from said restriction therein to said second passage means intermediate said restriction therein and said first fuel pressure differential responsive means.

3. Fuel control apparatus as claimed in claim 2 wherein:
 - said restriction in said second passage means and said restriction in said third passage means are fixed and have equal flow areas.

4. Fuel control apparatus as claimed in claim 1 wherein:
 - said pressurized source is a positive displacement fuel pump;
 - said first valve means includes a variable area valve for controlling the effective flow area of said supply conduit and a fuel bypass valve operatively connected to said supply conduit for maintaining a constant predetermined fuel pressure differential across said variable area valve.

5. Fuel control apparatus as claimed in claim 1 wherein:
 - said variable conditions of engine operation includes position of a power lever and engine speed.

6. Fuel control apparatus as claimed in claim 5 wherein:
 - said variable conditions of operation further include an engine operating air pressure related to engine power output.

7. Fuel control apparatus as claimed in claim 6 wherein:
 - said variable conditions of engine operation further include the temperature and pressure of air consumed by the engine.

8. Fuel control apparatus as claimed in claim 1 wherein:
 - said control means includes an electrically actuated proportional solenoid connected to said variable area valve and responsive to an electrical input signal; and
 - electronic means responsive to said plurality of variable conditions of engine operation for producting said electrical input signal as a function of said variable conditions of engine operation.

9. Fuel control apparatus as claimed in claim 1 and further including:
 - position signal generating means operatively connected to said first positionable valve means; and
 - means operatively connecting said position signal generating means and said control means for transmitting said position signal to said control means.

10. Fuel control apparatus as claimed in claim 1 and further including:
 - first and second stop means operatively connected to said first positionable valve means for limiting movement of said first valve means in a closing and opening direction, respectively.

11. Fuel control apparatus as claimed in claim 8 and further including:
 - an emergency fuel supply conduit connected at one end to said supply conduit upstream from said first valve means and at the opposite end to said supply conduit downstream from said second valve means;
 - normally closed third valve means in said emergency fuel supply conduit blocking fuel flow therethrough;
 - fourth valve means in said emergency fuel supply conduit for controlling the effective flow area thereof;
 - electrically actuated means operatively connected to said third valve means for actuating the same to an open position in response to an electrical power failure; and means responsive to a plurality of variable conditions of engine operation operatively connected to said fourth valve means for actuating the same.

12. Fuel control apparatus as claimed in claim 10 wherein:

said last named means includes a three dimensional cam contoured as a function of said plurality of variable conditions associated therewith which includes position of a power lever and atmospheric air pressure.

* * * * *